US008452692B2

(12) United States Patent
Seale et al.

(10) Patent No.: US 8,452,692 B2
(45) Date of Patent: *May 28, 2013

(54) METHOD AND SYSTEM FOR MANAGING EXCHANGE TRADED FUNDS USING AN INTRADAY INDICATIVE VALUE

(75) Inventors: William E. Seale, Annapolis, MD (US); Taeyong Lee, Frederick, MD (US)

(73) Assignee: Profund Advisors LLC, Bethesda, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/231,707

(22) Filed: Sep. 13, 2011

(65) Prior Publication Data
US 2012/0078773 A1    Mar. 29, 2012

Related U.S. Application Data

(63) Continuation of application No. 11/397,902, filed on Apr. 5, 2006, now Pat. No. 8,041,625.

(60) Provisional application No. 60/668,601, filed on Apr. 6, 2005, provisional application No. 60/719,985, filed on Sep. 26, 2005.

(51) Int. Cl.
*G06Q 40/00* (2006.01)

(52) U.S. Cl.
USPC .............. 705/37; 705/36 R; 705/35; 705/1.1; 705/40

(58) Field of Classification Search
USPC .................. 705/1.1, 37, 36 R, 35, 40, 30, 39, 705/44; 707/104; 463/25; 714/37
See application file for complete search history.

(56) References Cited

U.S. PATENT DOCUMENTS

| 5,926,792 A | 7/1999 | Koppes et al. |
| 7,571,134 B1 | 8/2009 | Burns et al. |

(Continued)

FOREIGN PATENT DOCUMENTS

| JP | 2002-342567 | 11/2002 |
| WO | WO 2004/006057 A2 | 1/2004 |

OTHER PUBLICATIONS

Kuo, Mu-Hsing & Chen, Chih-Lung—"An ETF Trading Decision Support System by Using Neural Network & Technical Indicators"—2006 International Joint Conference on Neural Networks Sheraton Vancouver Wall Centre Hotel, Vancouver, BC, Canada Jul. 16-21, 2006.*

(Continued)

*Primary Examiner* — John H Holly
(74) *Attorney, Agent, or Firm* — Finnegan, Henderson, Farabow, Garrett & Dunner, LLP (57) ABSTRACT

A computer implemented method, system, and software for calculating and using an intraday indicative value of a leveraged Bullish or Bearish exchange traded fund ("ETF") for arbitrage purposes, includes calculating an intraday current value of all the equity securities in the ETF (applicable only to Bullish ETFs), calculating mark to market gains or losses of at least one derivative product, and retrieving an accumulated loss or gain of the at least one derivative product and other cash equivalent amounts. The intraday indicative value of the ETF is determined by combining the calculated intraday current value of all the equity securities (applicable only to Bullish ETFs), the accumulated loss or gain, the mark to market gains of the at least one derivative product and other cash equivalent amounts. The determined intraday value of the ETF is used, by a party, for arbitrage purposes.

26 Claims, 8 Drawing Sheets

U.S. PATENT DOCUMENTS

| | | | |
|---|---|---|---|
| 7,698,192 | B2 | 4/2010 | Kiron et al. |
| 7,917,422 | B2 | 3/2011 | Kiron et al. |
| 2002/0120555 | A1* | 8/2002 | Lerner ............................. 705/37 |
| 2003/0115128 | A1* | 6/2003 | Lange et al. ..................... 705/37 |
| 2004/0225593 | A1* | 11/2004 | Frankel et al. ................... 705/37 |
| 2006/0100949 | A1 | 5/2006 | Whaley et al. |
| 2006/0184438 | A1 | 8/2006 | McDow |
| 2007/0156573 | A1 | 7/2007 | Whitehurst et al. |
| 2007/0168273 | A1 | 7/2007 | Barone et al. |
| 2008/0215499 | A1 | 9/2008 | O'Neill |
| 2008/0288416 | A1 | 11/2008 | Arnott et al. |
| 2009/0043713 | A1 | 2/2009 | Weber et al. |
| 2009/0259597 | A1 | 10/2009 | Wallman |

OTHER PUBLICATIONS

Order Under Sections 6(c) and 17(b) of the Investment Company Act of 1940, Case No. 812-12354 (2 pages).

Application for Order Under Sections 6(c) and 17(b) of the Investment Company Act of 1940, Case No. 812-12354, filed with the SEC on Dec. 5, 2000, (99 pages).

Amended Registration Statement filed with the Securities and Exchange Commission on Jan. 7, 2004, registration Nos. 333-89822; 811-21114 (104 pages).

Amended Registration Statement filed with the Securities and Exchange Commission on Jul. 17, 2003, registration Nos. 333-89822; 811-21114 (83 pages).

Amended Registration Statement filed with the Securities and Exchange Commission on Oct. 31, 2002, registration Nos. 333-89822; 811-21114 (76 pages).

Amendment Registration Statement filed with the Securities and Exchange Commission on Jun. 5, 2002, file No. 811-21114 (75 pages).

Kuo, Mu-Hsing et al., "An ETF Trading Decision Support System by Using Neural Network and Technical Indicators," 2006 International Joint Conference on Neural Networks, Vancouver, BC, Canada, Jul. 16-21, 2006 (8 pages).

Huang Chiung-Fen et. al., "Application of New a Priori Algorithm MDNC to Exchange Traded Fund," 2009 International Conference on Computational Science and Engineering, IEEE Computer Society, 2009 (8 pages).

Examination Report from Intellectual Property Office of Singapore, mailed Jun. 12, 2009, in corresponding Singapore Patent Application No. 200716626-7, filed Apr. 6, 2006 (7 pages).

International Search Report for PCT/US06/12717 dated Aug. 23, 2007 (2 pages).

Written Opinion of the International Searching Authority for PCT/US06/12717 dated Aug. 23, 2007 (6 pages).

Communication mailed Sep. 4, 2012, from Japanese Patent Office in counterpart Japanese Patent Application No. 2008-505498 (2 pages).

"Daiwa Asset Management, Exchange Traded Fund (ETF), Stock Index-Linked Exchange Traded Fund (Physically-backed)," Daiwa Asset Management, Daiwa Securities, Oct. 4, 2004 (2 pages).

"Try Bull-Bear Fund!," "All About" of Internet Site, published on Mar. 31, 2004, available online at URL: http://allabout.co.jp/gm/gc/11676 (5 pages).

Notification of Reason for Rejection dated Feb. 7, 2012 mailed from the Japanese Patent Office in counterpart Japanese Patent Application No. 2008-505498 (4 pages).

* cited by examiner

SAMPLE IIV FILE 100

| PORTFOLIO | TRADE DATE | INDEX RECEIPT SYMBOL | INDEX RECEIPT CUSIP | SECURITY TYPE | LONG OR SHORT | UNDERLYING | MULTIPLIER | MATURITY | CALL OR PUT | STRIKE PRICE | VALUE | CLOSING PRICE | QUANTITY | FUTURE USE | FUTURE USE |
|---|---|---|---|---|---|---|---|---|---|---|---|---|---|---|---|
| | 10/01/2005 | XQQ | 11111111 | EQT | L | 0 | 0 | | 0 | 0 | 90,000,000 | - | 0 | 0 | 0 |
| | 10/01/2005 | XQQ | 11111111 | SWP | L | NDX | 0 | | 0 | 0 | 90,000,000 | 1,000 | 0 | 0 | 0 |
| | 10/01/2005 | XQQ | 11111111 | FUT | 0 | NDX | 100 | DEC-05 | 0 | 0 | 20,000,000 | 1,000 | 200 | 0 | 0 |
| | 10/01/2005 | XQQ | 11111111 | FUM | 0 | 0 | 0 | | 0 | 0 | - | - | 0 | 0 | 0 |
| | 10/01/2005 | XQQ | 11111111 | OPI | 0 | 0 | 0 | | 0 | 0 | - | - | 0 | 0 | 0 |
| | 10/01/2005 | XQQ | 11111111 | OPE | 0 | 0 | 0 | | 0 | 0 | - | - | 0 | 0 | 0 |
| | 10/01/2005 | XQQ | 11111111 | ZZZ | 0 | 0 | 0 | | 0 | 0 | - | - | 0 | 0 | 0 |
| | 10/01/2005 | XQQ | 11111111 | ZZZ | 0 | 0 | 0 | | 0 | 0 | - | - | 0 | 0 | 0 |
| | 10/01/2005 | XQQ | 11111111 | ZZZ | 0 | 0 | 0 | | 0 | 0 | 10,000,000 | - | 0 | 0 | 0 |
| | 10/01/2005 | XQQ | 11111111 | NOA | 0 | 0 | 0 | | 0 | 0 | 100,000,000 | - | 0 | 0 | 0 |
| | 10/01/2005 | XQQ | 11111111 | TNA | 0 | 0 | 0 | | 0 | 0 | 1,000,000 | - | 0 | 0 | 0 |
| | 10/01/2005 | XQQ | 11111111 | TSO | 0 | 0 | 0 | | 0 | 0 | - | - | 0 | 0 | 0 |
| | 10/01/2005 | SQQ | 22222222 | EQT | 0 | 0 | 0 | | 0 | 0 | - | - | 0 | 0 | 0 |
| | 10/01/2005 | SQQ | 22222222 | SWP | S | NDX | 0 | | 0 | 0 | 80,000,000 | 1,000 | 0 | 0 | 0 |
| | 10/01/2005 | SQQ | 22222222 | FUT | 0 | NDX | 20 | DEC-05 | 0 | 0 | 20,000,000 | 1,000 | 1000 | 0 | 0 |
| | 10/01/2005 | SQQ | 22222222 | FUM | S | 0 | 0 | | 0 | 0 | - | - | 0 | 0 | 0 |
| | 10/01/2005 | SQQ | 22222222 | OPI | 0 | 0 | 0 | | 0 | 0 | - | - | 0 | 0 | 0 |
| | 10/01/2005 | SQQ | 22222222 | OPF | 0 | 0 | 0 | | 0 | 0 | - | - | 0 | 0 | 0 |
| | 10/01/2005 | SQQ | 22222222 | ZZZ | 0 | 0 | 0 | | 0 | 0 | - | - | 0 | 0 | 0 |
| | 10/01/2005 | SQQ | 22222222 | ZZZ | 0 | 0 | 0 | | 0 | 0 | - | - | 0 | 0 | 0 |
| | 10/01/2005 | SQQ | 22222222 | ZZZ | 0 | 0 | 0 | | 0 | 0 | - | - | 0 | 0 | 0 |
| | 10/01/2005 | SQQ | 22222222 | NOA | 0 | 0 | 0 | | 0 | 0 | 100,000,000 | - | 0 | 0 | 0 |
| | 10/01/2005 | SQQ | 22222222 | TNA | 0 | 0 | 0 | | 0 | 0 | 100,000,000 | - | 0 | 0 | 0 |
| | 10/01/2005 | SQQ | 22222222 | TSO | 0 | 0 | 0 | | 0 | 0 | 1,000,000 | - | 0 | 0 | 0 |

NOTE 1: THIS IIV FILE IS BASED ON HYPOTHETICAL INFORMATION.
NOTE 2: IN THIS SAMPLE, XQQ IS A HYPOTHETICAL TICKER SYMBOL FOR A HYPOTHETICAL BULLISH FUND (200% DAILY PERFORMANCE OF NASDAQ100 INDEX).
NOTE 3: IN THIS SAMPLE, SQQ IS A HYPOTHETICAL TICKER SYMBOL FOR A HYPOTHETICAL BEARISH FUND (-100% DAILY PERFORMANCE OF NASDAQ100 INDEX).

FIG. 1

HEADERS
A: SECURITY TYPE
B: LONG OR SHORT
C: UNDERLYING
D: MULTIPLIER
E: MATURITY
F: OPTIONS DETAILS (CALL OR PUT, STRIKE PRICE)
G: VALUE/CLOSING PRICE/QUANTITY

SYMBOLS

| HEADER | SYMBOLS | DESCRIPTION |
|---|---|---|
| A: SECURITY TYPE | EQT | EQUITIES |
| | SWP | SWAPS |
| | FUT | FUTURES (REGULAR) |
| | FUM | FUTURES (E-MINI) |
| | OPI | OPTIONS ON INDEX |
| | OPF | OPTIONS ON FUTURES |
| | ZZZ | RESERVED FOR FUTURE USE |
| | NOA | NET OTHER ASSETS |
| | TNA | TOTAL NET ASSETS |
| | TSO | TOTAL SHARES OUTSTANDING |
| B: LONG OR SHORT | L | LONG |
| | S | SHORT |
| C: UNDERLYING | DJI | DOW JONES INDUSTRIAL AVERAGE |
| | NDX | NASDAQ 100 INDEX |
| | SPX | S&P 500 INDEX |
| | MID | S&P MIDCAP 400 INDEX |
| | NDZ05 | NASDAQ 100 FUTURES EXPIRING DECEMBER 2005 (H: MARCH, M: JUNE, U: SEPTEMBER, Z: DECEMBER) |
| D: MULTIPLIER | NUMERIC INPUT | MULTIPLIER FOR THE FUTURES AND OPTIONS |
| E: MATURITY | DEC05 | DECEMBER 2005 AND SO FORTH |
| F: OPTIONS DETAILS | C OR P | CALL OR PUT |
| | NUMERIC INPUT - "STRIKE PRICE" | |
| G: VALUE/CLOSING PRICE/QUANTITY | NUMERIC INPUT - "VALUE" | $ VALUE OF THE POSITIONS (NOTIONAL VALUE FOR SWAPS AND FUTURES) |
| | NUMERIC INPUT - "CLOSING PRICE" | VALUE PRICE USED FOR LAST NIGHT'S NAV CALCULATION |
| | NUMERIC INPUT - "QUANTITY" | NUMBER OF CONTRACTS |

IIV CALCULATION FOR LEVERAGED ETFs

+2 X NASDAQ100 ETF

| | | |
|---|---|---|
| CURRENT INDEX VALUE (NDX) | 1,008.01 | TO BE USED TO CALCULATE GAINS/LOSSES OF SWAPS |
| CURRENT NASDAQ 100 FUTURES PRICE (EXPIRING DECEMBER 2004) | 1,010.00 | TO BE USED TO CALCULATE GAINS/LOSSES OF FUTURES |
| % CHANGE OF THE DEPOSIT BASKET (FROM PCF) | 1% | TO BE USED TO CALCULATE CURRENT VALUE OF EQUITIES |
| PREVIOUS DAY'S END-OF-DAY NAV PER SHARE | 100.00 | |

| IIV FILE LINE ITEMS/DESCRIPTION | | CURRENT VALUE | | |
|---|---|---|---|---|
| VALUE OF TOTAL EQUITIES | $ 990,004,643.40 | | $ 999,904,689.83 | CURRENT VALUE OF EQUITIES | STEP 1 — 310 |
| NOTIONAL VALUE OF TOTAL RETURN EQUITY SWAPS ON NDX (LONG) | $ 959,990,356.60 | | $ 9,599,615.000 | MARK-TO-MARKET GAIN/LOSS FROM SWAP | STEP 2 — 320 |
| YESTERDAY'S VALUATION PRICE (=INDEX CLOSING VALUE) FOR SWAPS | 998.03 | | | | |
| NOTIONAL VALUE OF NASDAQ 100 FUTURES (LONG) | $ 50,000,000.00 | | $ 500,000.00 | MARK-TO-MARKET GAIN/LOSS FROM FUTURES | STEP 2 |
| NUMBER OF FUTURES CONTRACTS | 500 | | | | |
| YESTERDAY'S VALUATION PRICE FOR FUTURES | 1,000.00 | | | | |
| NET OTHER ASSETS (ESTIMATED CASH AMOUNT) | $ 10,055,358.60 | | $ 10,055,356.60 | (FIXED ALL DAY) | |
| TOTAL NET ASSETS IN THE FUND | $ 1,000,060,000.00 | | $ 1,020,059,661.43 | CURRENT TOTAL NET ASSETS | STEP 3 — 330 |
| TOTAL SHARES OUTSTANDING | 10,000,600.00 | | 10,000,600.00 | (FIXED ALL DAY) | |
| | | | $ 102.00 | IIV | STEP 4 — 340 |
| | | | 2.00% | % CHANGE | |

STEPS TO CALCULATE THE IIV

EXHIBIT 3

LEVERAGED ETF (+200%)

LAST NIGHT (BEFORE MARKET OPEN)

| | |
|---|---:|
| SHARE NUMBERS IN ONE CREATION UNIT | 50,000 |
| NAV PER SHARE | 100.00 |
| VALUE OF 1 C.U. | 5,000,000.00 |
| VALUE OF DEPOSIT SECURITIES IN PCF | 5,000,000.00 |
| ESTIMATED CASH | 0.00 |

ASSUME THAT THE FUND HAS A TOTAL OF 200% EXPOSURES WITH ADDITIONAL "NOTIONAL EXPOSURE" IN DERIVATIVES. FUND'S VALUE (AS INDICATED BY NAV PER SHARE) WILL FLUCTUATE 2 TIME THE % CHANGE OF THE INDEX.

AT THE END OF THE DAY

| | INDEX UP | 10% | | INDEX UP | |
|---|---|---:|---|---|---:|
| | CREATION | | | REDEMPTION | 1 |
| NAV PER SHARE | | 120.00 | NAV PER SHARE | | 120.00 |
| VALUE OF 1 C.U. | | 6,000,000.00 | VALUE OF 1 C.U. | | 6,000,000.00 |
| VALUE OF DEPOSIT SECURITIES | | 5,500,000.00 | VALUE OF DEPOSIT SECURITIES | | 5,500,000.00 |
| BALANCING AMOUNT | $ | 500,000.00 | BALANCING AMOUNT | $ | (500,000.00) |
| AP RECEIVES FUND SHARES/DELIVERS EQUITIES AND CASH | | | AP DELIVERS FUND SHARES/RECEIVES EQUITIES AND CASH | | |
| | INDEX DOWN | -10% | | INDEX DOWN | |
| | CREATION | 1 | | REDEMPTION | 1 |
| NAV PER SHARE | | 80.00 | NAV PER SHARE | | 80.00 |
| VALUE OF 1 C.U. | | 4,000,000.00 | VALUE OF 1 C.U. | | 4,000,000.00 |
| VALUE OF DEPOSIT SECURITIES | | 4,500,000.00 | VALUE OF DEPOSIT SECURITIES | | 4,500,000.00 |
| BALANCING AMOUNT | $ | (500,000.00) | BALANCING AMOUNT | $ | 500,000.00 |
| AP RECEIVES FUND SHARES AND CASH / DELIVERS EQUITIES | | | AP DELIVERS FUND SHARES AND CASH / RECEIVES EQUITIES | | |

*FIG. 6*

METHOD AND SYSTEM FOR MANAGING EXCHANGE TRADED FUNDS USING AN INTRADAY INDICATIVE VALUE

CROSS-REFERENCE TO RELATED APPLICATIONS

This is a continuation of application Ser. No. 11/397,902, filed Apr. 5, 2006 now U.S. Pat. No. 8,041,625, which claims the benefit of priority under 35 U.S.C. §119(e) of provisional application serial number 60/668,601 filed on Apr. 6, 2005, and provisional application Ser. No. 60/719,985 filed on Sep. 26, 2005, the disclosures of all of the above-mentioned applications are incorporated herein by reference in their entireties.

BACKGROUND OF THE INVENTION

The present invention relates generally to the field of exchange traded funds. In particular, it relates to a method and system for calculating an intraday indicative value for leveraged bullish and/or bearish exchange traded funds ("ETF").

Shares of ETFs are traded intraday throughout the exchange trading hours. Investors can buy or sell these shares anytime during the trading hours and achieve the performance of a stock or bond portfolio as a single security. Currently, all of the ETFs listed on the U.S. Exchanges are "Index Funds or Trusts" that track specific market indexes. However, leveraged bullish and bearish ETFs (individually "Bullish ETFs" or "Bearish ETFs" and together "Bullish and Bearish ETFs") have only been proposed recently.

SUMMARY OF THE INVENTION

In certain embodiments the present invention relates to a computer implemented method of calculating and using an intraday value of a Bullish ETF for arbitrage purposes, comprising the steps of: calculating, or having calculated, an intraday current value of all the equity securities in the ETF; calculating, or having calculated, mark to market gains or losses of at least one derivative product; retrieving, or having retrieved, an accumulated loss or gain of the at least one derivative product; retrieving other cash equivalent amounts; determining, or having determined, the intraday value of the ETF by combining the calculated intraday current value of all the equity securities, the accumulated loss or gain and the mark to market gains or losses of the at least one derivative product; and other cash equivalent amounts; and using the determined intraday value of the ETF, by a party, for arbitrage purposes.

In certain embodiments, the derivative product comprises one or more of a swap contract, a forward contract, a futures contract, an options contract or the like.

In certain embodiments, the step of determining the intraday value is performed in near real time.

In certain embodiments, the method further comprises: comparing, by the party, of the determined intraday value of the ETF to a traded value of the ETF; and performing, by the party, an arbitrage transaction if the difference between the determined intraday value of the ETF differs from the traded value of the ETF by a threshold value.

In certain embodiments, the method further comprises calculating a balancing amount for purposes of fund share creation or redemption that is composed largely of the gain or loss of at least one derivative product.

In certain other embodiments, the present invention provides a computer implemented method of using an intraday value of a Bearish ETF for arbitrage purposes, comprising the steps of: calculating, or having calculated, mark to market gains or losses of at least one derivative product; retrieving, or having retrieved, an accumulated loss or gain of the at least one derivative product; retrieving, or having retrieved, other cash equivalent amounts; determining, or having determined, the intraday value of the ETF by combining the accumulated loss or gain, the mark to market gains or losses of the at least one derivative product; and other cash equivalent amounts; and using the determined intraday value of the ETF, by a party, for arbitrage purposes.

In certain embodiments, the above mentioned method further comprises receiving an IIV File (as defined herein) comprising values for: value of all the equity securities in the ETF (only applicable for Bullish ETFs); notional value of at least one derivative product; an accumulated loss or gain of the at least one derivative product; and other cash equivalent amounts. The received IIV File is used to determine an intraday value of the ETF by combining the calculated intraday current value of all the equity securities (only applicable for Bullish ETFs), the accumulated loss or gain, the mark to market gains or losses of the at least one derivative product; and other cash equivalent amounts, and the determined intraday value of the ETF is used for arbitrage purposes.

In certain other embodiments, the present invention provides a computer implemented method of providing an IIV File for a Bullish or Bearish ETF, comprising: (1) periodically creating an IIV File comprising values for: value of all the equity securities in the ETF (only applicable to Bullish ETFs); notional value of at least one derivative product; an accumulated loss or gain of at least one derivative product; and other cash equivalent amounts; and (2) periodically sending the created IIV File to other parties.

Certain embodiments provide a computer readable medium having program code recorded thereon for calculating and using an intraday indicative value of a bullish exchange traded fund ("ETF") for arbitrage purposes when executed on a computing system, the program code including: code for calculating an intraday current value of all the equity securities in the ETF; code for calculating mark to market gains or losses of at least one derivative product; code for retrieving an accumulated loss or gain of at least one derivative product; code for determining the intraday indicative value of the ETF by combining the calculated intraday current value of all the equity securities, the accumulated loss or gain and the mark to market gains of the at least one derivative product; and code for using the determined intraday value of the ETF, by a party, for arbitrage purposes.

Certain other embodiments provide a computer readable medium having program code recorded thereon for calculating and using an intraday indicative value of a bearish exchange traded fund ("ETF") for arbitrage purposes when executed on a computing system, the program code including code for calculating mark to market gains or losses of at least one derivative product; code for retrieving an accumulated loss or gain of at least one derivative product; code for determining the intraday indicative value of the ETF by combining the accumulated loss or gain and the mark to market gains of the at least one derivative product; and code for using the determined intraday value of the ETF, by a party, for arbitrage purposes.

Certain embodiments provide a system for calculating and using an intraday indicative value of a bullish exchange traded fund ("ETF") for arbitrage purposes, including: a communication unit configured to receive an IIV file comprising a value of all equity securities in the ETF, the notional value of at least one derivative product. an accumulated gain or loss of the at least one derivative product, and other cash equivalent amounts; and a computing unit configured to calculate an intraday current value of all the equity securities in the ETF, calculate mark to market gains or losses of at least one derivative product, and determine the intraday indicative value of the ETF by combining the intraday current value of all the equity securities, the accumulated loss or gain and the mark to market gains of the at least one derivative product; and the computing unit configured to compare the intraday indicative value of the ETF to a market value of the ETF on a per share basis to make a determination for arbitrage purposes.

Certain other embodiments provide a system for calculating and using an intraday indicative value ("IIV") of a bearish exchange traded fund ("ETF") for arbitrage purposes, including: a communication unit configured to receive an IIV file comprising a notional value of at least one derivative product, an accumulated loss or gain of the least one derivative product, and other cash equivalent amounts; a computing unit configured to calculate mark to marked gains or losses of the at least one derivative product, retrieve an accumulated loss or gain of the at least one derivative product, and determine the IIV of the ETF by combining the accumulated loss or gain and the mark to marked gains of the at least one derivative product and the other cash equivalent amount, and said computing unit configured to compare the IIV of the ETF to a market value of the ETF on a per share basis to make a determination for arbitrage purposes.

BRIEF DESCRIPTION OF THE DRAWINGS

The accompanying drawings, which are incorporated in and constitute a part of the specification, illustrate embodiments of the invention and together with the description, serve to explain the principles of the invention.

FIGS. 1 and 2 show formats of an exemplary IIV File.

DETAILED DESCRIPTION OF THE PREFERRED EMBODIMENTS

Introduction

In certain embodiments, the present invention relates to Bullish and Bearish ETFs and systems and method for calculating and transmitting values of the bullish and bearish ETFs that may be used for arbitrage purposes so that efficient markets for these ETFs are facilitated.

Examples of such Bullish and Bearish ETFs may be based on various well-known indexes as listed below. It should be noted that the indexes and the percentages listed below are exemplary only and the principles of the present invention would apply to other indexes and percentages as would be recognized by one skilled in the art The investment objective for a Bullish or Bearish ETF is to track a percentage of the performance of the index, with the percentage being any multiple greater than, equal to or less than 100% of the performance of the underlying index. The following are some examples:

| Name | Investment Objective |
|---|---|
| Bullish ETFs | |
| Ultra S&P 500 ProShares a daily basis | +200% of the performance of S&P 500 Index on |
| Ultra QQQ ProShares on a daily basis | +200% of the performance of Nasdaq100 Index |
| Ultra Dow 30 ProShares Industrial Average on a daily basis | +200% of the performance of Dow Jones |
| Ultra Mid-Cap 400 ProShares Index on a daily basis | +200% of the performance of S&P MidCap 400 |
| Bearish ETFs | |
| Short S&P 500 ProShares a daily basis | −100% of the performance of S&P 500 Index on |
| Short QQQ ProShares on a daily basis | −100% of the performance of Nasdaq100 Index |
| Short Dow 30 ProShares Industrial Average on a daily basis | −100% of the performance of Dow Jones |
| Short Mid-Cap 400 ProShares Index on a daily basis | −100% of the performance of S&P MidCap 400 |
| UltraShort S&P 500 ProShares a daily basis | −200% of the performance of S&P 500 Index on |
| UltraShort QQQ ProShares on a daily basis | −200% of the performance of Nasdaq100 Index |
| UltraShort Dow 30 ProShares Industrial Average on a daily basis | −200% of the performance of Dow Jones |
| UltraShort Mid-Cap 400 ProShares Index on a daily basis | −200% of the performance of S&P MidCap 400 |

Operations and management of ETFs require various technical processes to ensure the effectiveness of intended product design. More specifically, as the shares of the ETFs are traded on an Exchange, their trading prices are supposed to stay close to the "fair value" of the shares throughout the trading hours. Various processes need to be in place to achieve that result.

In order to achieve these features successfully, ETFs offer the mechanisms that encourage effective arbitrage activities by the institutional market participants, which are typically major brokers-dealers and investment banks. Two of the important mechanisms that allow effective arbitrage activities are: near real-time Intraday Indicative Value ("IIV") calculation and Continuous Creation/Redemption. Each of these two mechanisms is discussed in detail in the two parts further herein.

As discussed in certain embodiments with respect to the Bullish ETFs and Bearish ETFs; these mechanisms work differently when compared to other existing ETFs. Certain embodiments of the present invention provide unique computer implemented techniques and processes to ensure at least equivalent accuracy and effectiveness relative to processes that are currently available with respect to other ETFs.

Part I. Indicative Intraday Value ("IIV") Calculation for Bullish ETFs

A. Definition and Role of IIV

Exchange Traded Funds ("ETFs"), similar to the traditional mutual funds, are required to calculate the "official closing" net asset value ("NAV") per share, based on 4 pm (or at some fixed time) closing prices and/or fair values of the securities held in the fund once per day on every business day.

Unlike the traditional mutual funds, shares of ETFs trade on the exchanges throughout the trading hours, and the "estimated real-time value" of the ETF, in terms of value per single share is calculated and disseminated by a third party (typically the Primary Listing Exchange for the ETF). This estimated real-time value is called "IIV", and is typically updated frequently, for example, every 15 seconds during market hours (market makers are able to calculate IIV on a real-time basis). It should be noted that, while the IIV is also referred to as "Underlying Trading Value (UTV)" among some market participants, in this application only the term IIV is used.

Generally, IIV is calculated by valuing the sample subset of the assets held in the ETF at current prices during the market hours. This calculation methodology is similar to the basic concept employed to calculate an official closing NAV (at the end of the business day) required for both traditional mutual funds and conventional ETFs. Therefore, IIV based on the 4 pm closing prices should be almost equal to the official closing NAV of the ETF.

By comparing these IIV figures to the trading price of the respective ETFs, one would know whether the current trading price (or bid-ask price) of a particular ETF is at premium or discount relative to its indicative real-time value. For example, if the IIV of an ETF shows $100 compared to the quoted price of $102 at a particular moment, it would indicate that the ETF shares are traded at premium (i.e., at a higher price than the fair value of $100.)

IIVs also play an important role for the institutional market participants who are ready to engage in the arbitrage activities when the opportunities arise. These institutional participants include, for example, the exchange specialists, market makers, and other arbitrageurs. One of the key institutional participants are "Authorized Participants (APs)" who carry out the important functions, including market making and arbitrage activities, in the ETF market place. APs are the only entities that can create (buy) or redeem (sell) the ETF shares directly with the fund that issues the ETF. Part II, further herein, provides additional information of the role of APs with respect to creation and redemption of ETF shares directly with the fund. Being able to calculate the accurate IIV is critical for these participants since it allows them to actively engage in market making and arbitrage activities, which in turn, keeps the trading price of the ETF shares close to the real-time fair value. The success and value of this mechanism becomes apparent when compared to the persistent and significant premium/discount facing closed-end funds. Although the shares of the closed-end funds also trade on the exchanges, the "closed" structure does not provide the same effective arbitrage mechanism that the "open-end" ETFs offer since the shares of the closed end funds are typically fixed in absence of a share offer.

B. IIV Calculation Methodology for Conventional Index-Based ETFs

To facilitate the calculation of IIV for a share of a conventional ETF, the ETF advisor, with the collaboration of the Index Receipt Agent, prepares and transmits a specially formatted file, known as the "Portfolio Composition File (PCF)", to the National Securities Clearing Corporation ("NSCC") each business day. PCF contains a complete data set with which a third party can use to calculate the IIV of the ETF throughout the trading hours since the fund holdings information in the data set (held by the ETF) does not change during the course of the day.

The PCF is prepared to represent a single "Creation Unit" which typically consists of 50,000 shares of the ETF. In certain embodiments, a Creation Unit is the minimum size that APs can create or redeem fund shares directly with the statutory trust creating the units. Direct transactions with the ETF are typically only permitted in a multiple of the Creation Units through an AP. Part II, further herein, provides details of direct transactions with ETFs for the creation or redemption of ETF shares (typically in Creation Units). If the price of one share is $100, the value of one Creation Unit, consisting of 50,000 shares, would be $5,000,000. Other investors who do not have large number of shares to trade and/or are not acting as APs can buy and sell the ETF shares (in lot sizes different than a creation unit) on the exchanges through their brokers.

The PCF may be downloaded by all entities with a link to the NSCC system (e.g. stock exchanges, APs). These entities are able to download the PCF of an ETF from NSCC, upon the receipt and processing of data by the NSCC from the particular ETF investment advisor. Based on these PCFs, APs and exchanges are able to calculate an accurate near real-time IIV during the trading hours.

Conventional index-based ETFs, similar to traditional index-based mutual funds, generally hold the same securities that are contained in the Underlying Index that the fund tracks. Any residual cash, if any, is typically invested in various money-market or other short-term cash instruments. Therefore, the data set shown in a PCF represents a proportional subset of the ETF's entire asset structure, proportionately prepared in terms of one Creation Unit.

IIV for the conventional ETFs are determined by the following steps: (i) calculating the current value of the Deposit List (list of the securities as provided in PCF) based on the last sale prices, (ii) adding the amount calculated in (i) above to the estimated cash/money market instruments (as provided in PCF) to arrive at a cumulative value, and then (iii) dividing the cumulative value by the number of shares per Creation Unit Aggregation (which is the number of shares per creation unit) in order to obtain the estimated current value on a per share basis.

C. IIV Calculation Methodology for Bullish ETFs

In accordance with certain embodiments of the present invention, this section discloses the IIV calculation methodology for a Bullish ETF. For example, the investment objective of a Bullish ETF may be to achieve 200% of the performance of an underlying index on a daily basis. That is, the Bullish ETF seeks to achieve a gain or loss that is 200% of the respective gain or loss of the underlying index on a daily basis. Of course, one skilled in the art would recognize that the percentage (200%) and the time period (daily basis) may be varied without significantly altering the principles of the present invention.

In order to achieve the targeted leverage (i.e., for example 200%), the proposed Bullish ETF utilizes various financial instruments, including derivatives, in addition to equity securities in managing the portfolio exposure and to capture a movement proportional to the targeted leverage.

In contrast, conventional ETFs generally do not carry the derivative products as part of their holdings. Therefore, the data in the PCF (used by the conventional ETFs) is simply the list of equity or debt securities. The current format of the PCF that is compatible with the NSCC system is not designed to accommodate the various derivative contracts that the present invention utilizes for the management of the Bullish and Bearish ETFs.

As a result, in certain embodiments, the present invention provides for a separate file, named "IIV File," to complement the PCF as a way to provide an adequate data set for IIV calculation of a Bullish ETF. The IIV File is designed to provide detailed information about the derivatives positions in the Bullish ETF and all other information that is necessary for the accurate near real-time IIV calculation.

Figure 2:
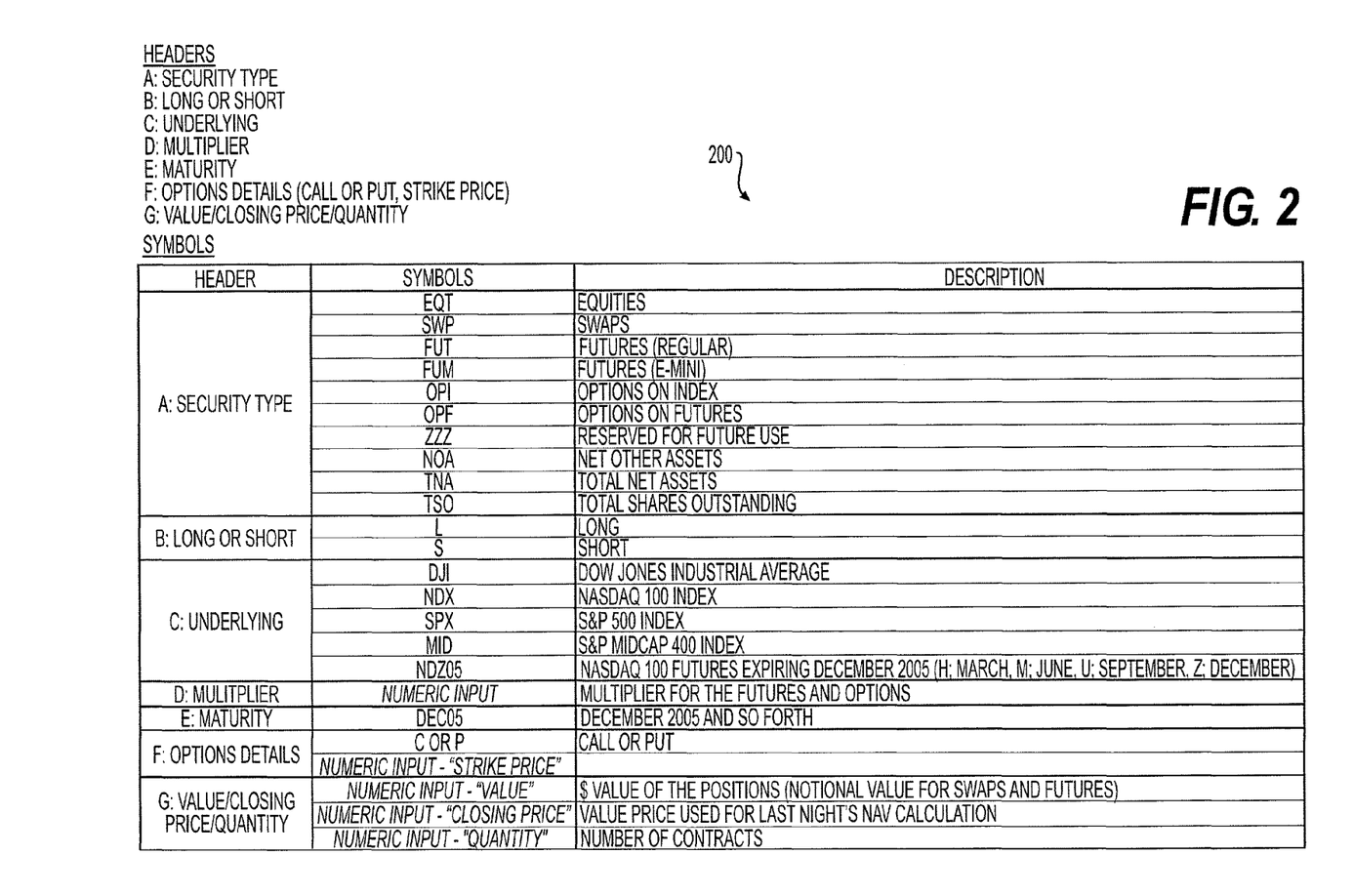

FIG. 1 shows an exemplary format of an IIV File 100 that may be used in certain embodiments of the present invention and FIG. 2 provides examples of headers and symbols (in a table 200) that may be used in the IIV File. It should be noted that FIGS. 1 and 2 are exemplary only and one skilled in the art would recognize various other modifications and alternatives all of which are considered as a part of the present invention. As shown in FIG. 1, the exemplary file format 100 is depicted with headers (which represent exemplary data fields) and various symbols and values representing data corresponding to each of the headers (which represent data fields). FIG. 2 provides examples of how the headers and symbols may be constructed in one embodiment of the computer implementation of the present invention. For example, the table 200 (in FIG. 2) illustrates the type of symbols that may be used in data fields (corresponding to specific headers) and also specifies a description of the meanings of the various symbols.

The daily IIV File may be provided via a secure website and is prepared to show all the necessary information of the entire ETF assets, as opposed to a subset of the proposed ETF assets (which is contained in a conventional PCF file), to ensure the accuracy of the IIV calculation. The PCF may still be prepared in terms of one Creation Unit and be made available through NSCC. It should be noted that the concept of an IIV File represents a formulaic or logical file which is implemented in a data processing system using techniques that are well known to those skilled in the art. One skilled in the art would also recognize that streaming or other evolving technologies may be used to transmit or access an IIV File (using wireline, optical, or wireless communications) and all such technologies are considered to be a part of the present invention.

The exchange and APs (or other parties that need to calculate, or have calculated, a near real-time IIV) require both PCF and IIV Files to calculate the IIV of Bullish ETFs. Alternatively, as would be recognized by one skilled in the art, the relevant information from the PCF file may be included in the IIV file so that one logical file contains all the information required to compute the IIV of the bullish ETF.

Figure 3A:
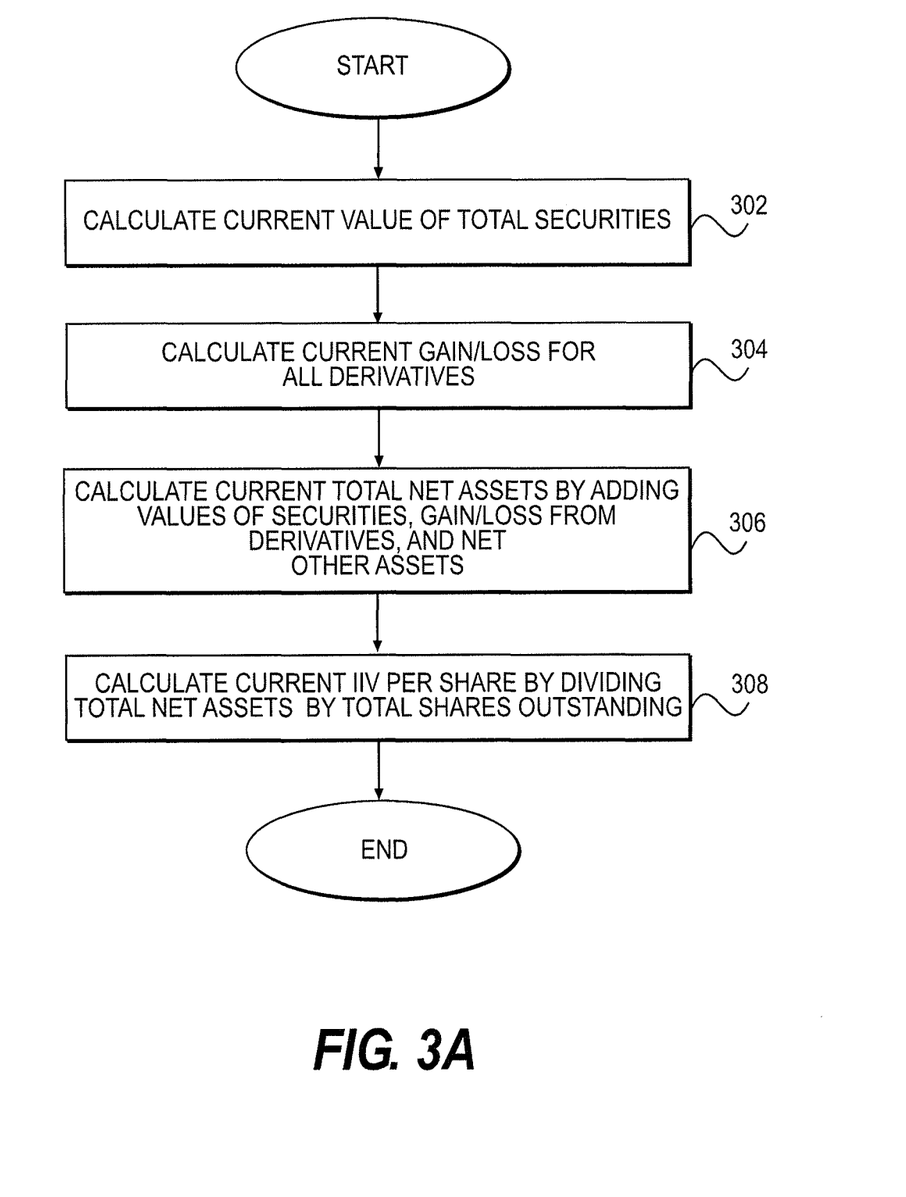
FIG. 3A is a flow diagram illustrating the general steps of an IIV calculation.

As shown in FIG. 3A, in certain embodiments, the IIV is determined by the following steps. (i) In step 302, calculating the estimated current value of equity securities held by the ETF by calculating the percentage change in the value of the. Deposit List (that is the list of securities provided in the PCF) and applying that percentage value to the total value of the equity securities in the ETF as of the close of trading on the prior trading day (as provided in IIV File). (ii) In step 304, calculating the mark-to-market gains or losses from the ETF's total return equity index swap exposure based on the percentage change of the Underlying Index and the previous day's notional values of the swap contracts, if any, held by such ETF (which previous day's notional value is provided in the IIV File). It should be noted that the same calculation is also applied to other similar forms of over-the-counter derivative contracts such as forwards and contracts for difference. (iii) In step 304, also calculating the mark-to-market gains or losses from futures and/or options positions by taking the difference between the current value of the futures and/or options contracts held by the ETF, if any, and the previous day's value of such positions (as provided in IIV File). (iv) In step 306, adding the values from (i), (ii), and (iii) above to an estimated cash amount (which cash amount includes the swap costs) (as provided in IIV File) to arrive at a value, and (v) in step 308, dividing that value by the total shares outstanding (as provided in IIV File) to obtain the current IIV per share.

Figure 3B:
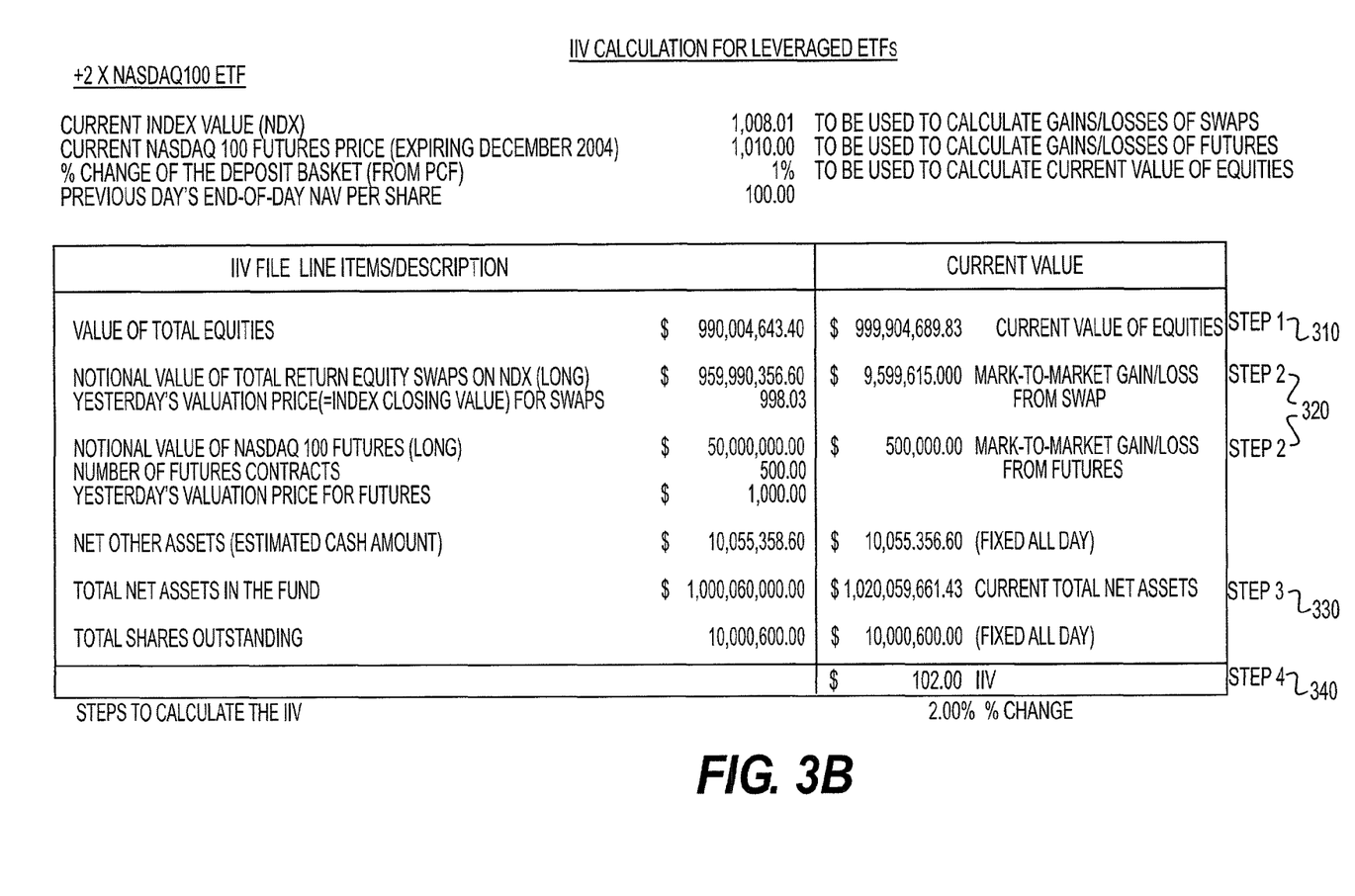
FIG. 3B is a diagram that illustrates the steps of calculating an IN with exemplary data.

These four steps are also illustrated as steps 310-340 in FIG. 3B which shows the application of these steps to an exemplary calculation of an IIV. In step 310, a current value of the equities is calculated from a current value of the securities included in the PCF by accounting for the percentage change (1% in the illustrated example) in value of the deposit list of securities in the PCF, with the percentage change applied to the previous day's value of total securities in the IIV File. In step 320, the current gains or losses from the swaps and futures are calculated to derive a mark-to-market gain or loss for the swaps and the futures. In step 330, the current total net assets are calculated by adding the total values of the equities, the gains or losses from the derivatives (swaps, futures, etc.) and net other assets (including cash). In step 340, the total net assets are divided by the total number of shares outstanding to arrive at the IIV per share.

D. IIV Calculation Methodology for Bearish ETFs

The investment objective of a Bearish ETF funds is to achieve, for example, (−100%) of the performance of the underlying index on a daily basis. That is, if the underlying index decreases by a certain percentage on a certain day, the objective of the Bearish ETF would be to increase by the same percentage on that day and vice versa.

In order to achieve the targeted leverage, the present invention utilizes various financial instruments, including futures and swaps, in managing the portfolio exposure. In other words, a total of (−100%) portfolio exposure is achieved through various financial instruments, mostly derivative products. As these Bearish ETFs do not invest in equity securities, leftover cash is invested in the money market instruments, including repurchase agreements.

As the current format of the PCF (used with conventional ETFs) that is compatible with the NSCC system is not designed to accommodate the various derivative contracts that are used with the present invention, certain embodiments of the present invention provide a separate file, named "IIV File," that contain the detailed information about the derivatives positions in the fund and all the other information that are necessary for an accurate IIV calculation. Structure of the IIV File for Bearish ETFs is substantially similar to the one prepared for the Bullish ETFs as shown in FIGS. 1-2 except that the fields and data related to the equities is missing or not used.

The daily IIV File may be provided via a secured website and is prepared to show all the necessary information of the entire ETF assets in order to ensure the accuracy of IIV calculation. As Bearish ETFs do not intend to invest in equities, there is no need for a PCF to be prepared for the Bearish ETFs.

The Exchanges and APs (or other third parties), using the IIV File, can calculate IIV using the following step: (i) Calculating, or having calculated, the mark-to-market gains or losses from the ETF's total return equity index swap exposure based on the percentage change to the Underlying Index and the previous day's notional values of the swap contracts, if any, held by such ETF (which previous day's notional value is provided in IIV File). It should be noted that the same calculation is also applied to other similar forms of over-the-counter derivative contracts such as forwards and contracts for difference. (ii) Calculating, or having calculated, the mark-to-market gains or losses from futures and/or options positions by taking the difference between the current value of the futures and/or options contracts held by the ETF, if any, and the previous day's value of such positions (as provided in IIV File). (iii) Adding the values from (i) and (ii) above to an estimated cash amount (which cash amount includes the swap costs) (as provided in IIV File) to arrive at a value, and (iv) dividing that value by the total shares outstanding (as provided in IIV File) to obtain the current IIV per share. See FIG. 3B for steps and an exemplary calculation of an IIV with the only change being that there would be no step 310 for the IIV calculation of a Bearish ETF since there are no equity positions held in a Bearish ETF.

Unique Features of the Present Invention

Figure 4:
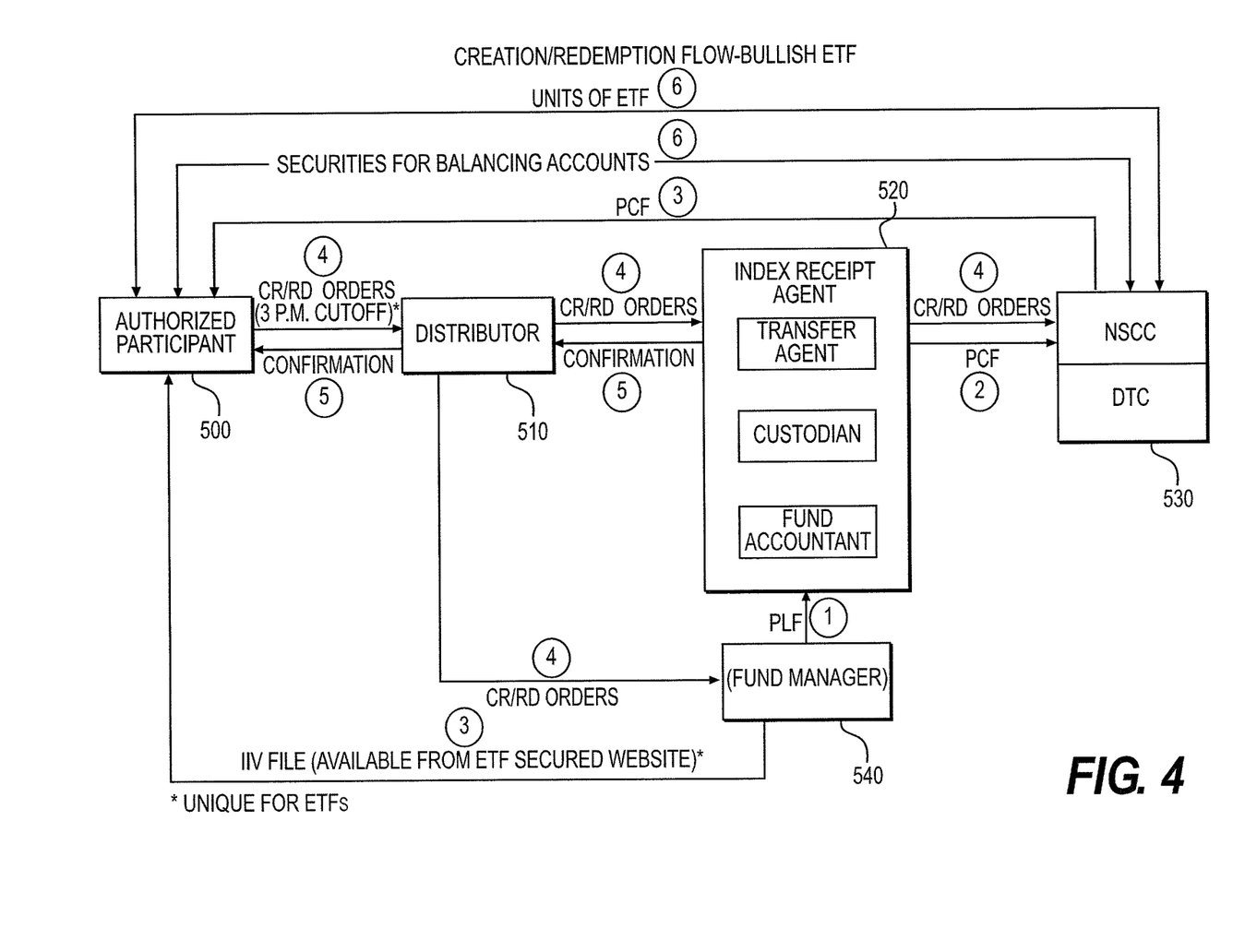
FIGS. 4 and 5 are diagrams that illustrate exemplary process flows of creating and redeeming Bullish and Bearish ETFs.
Figure 5:
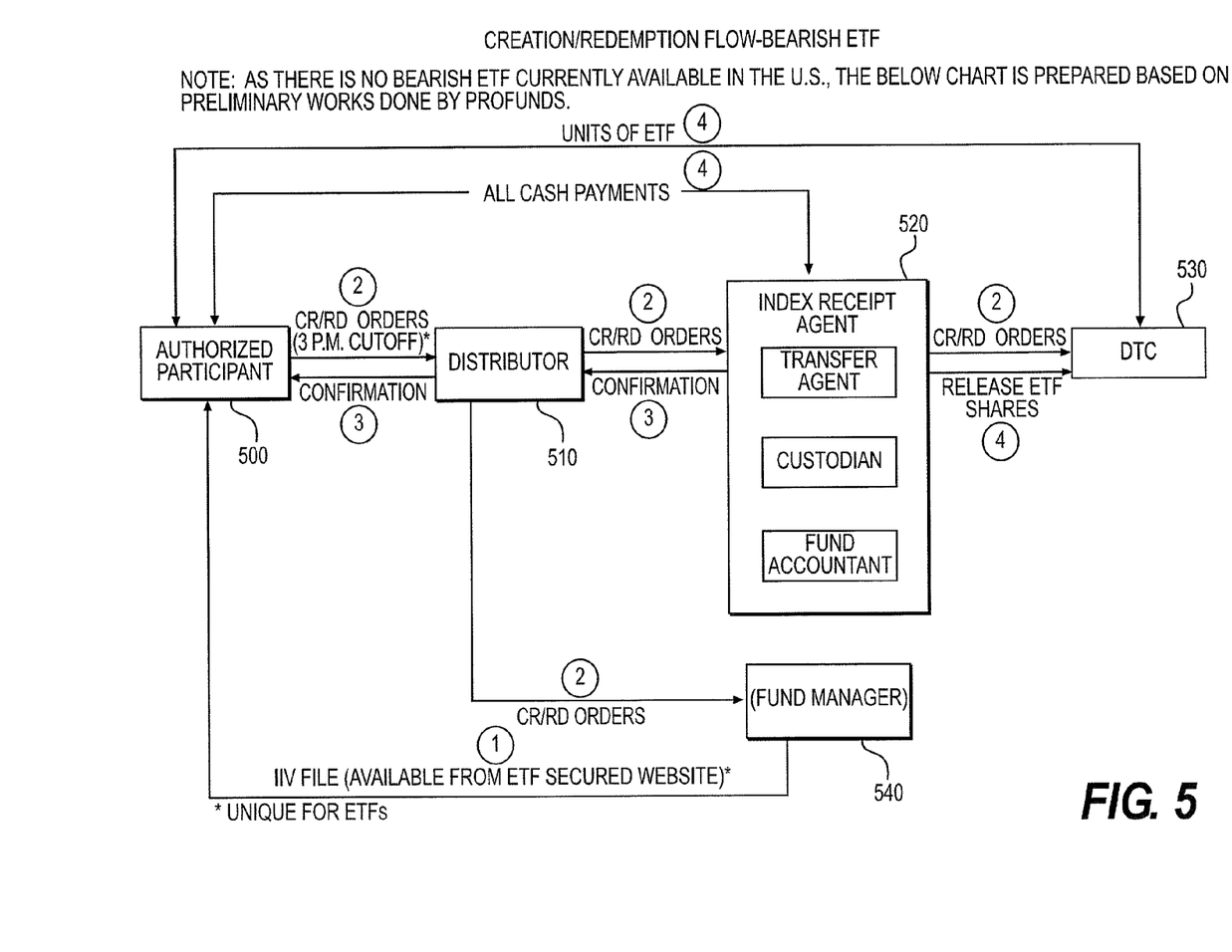
Figure 6:
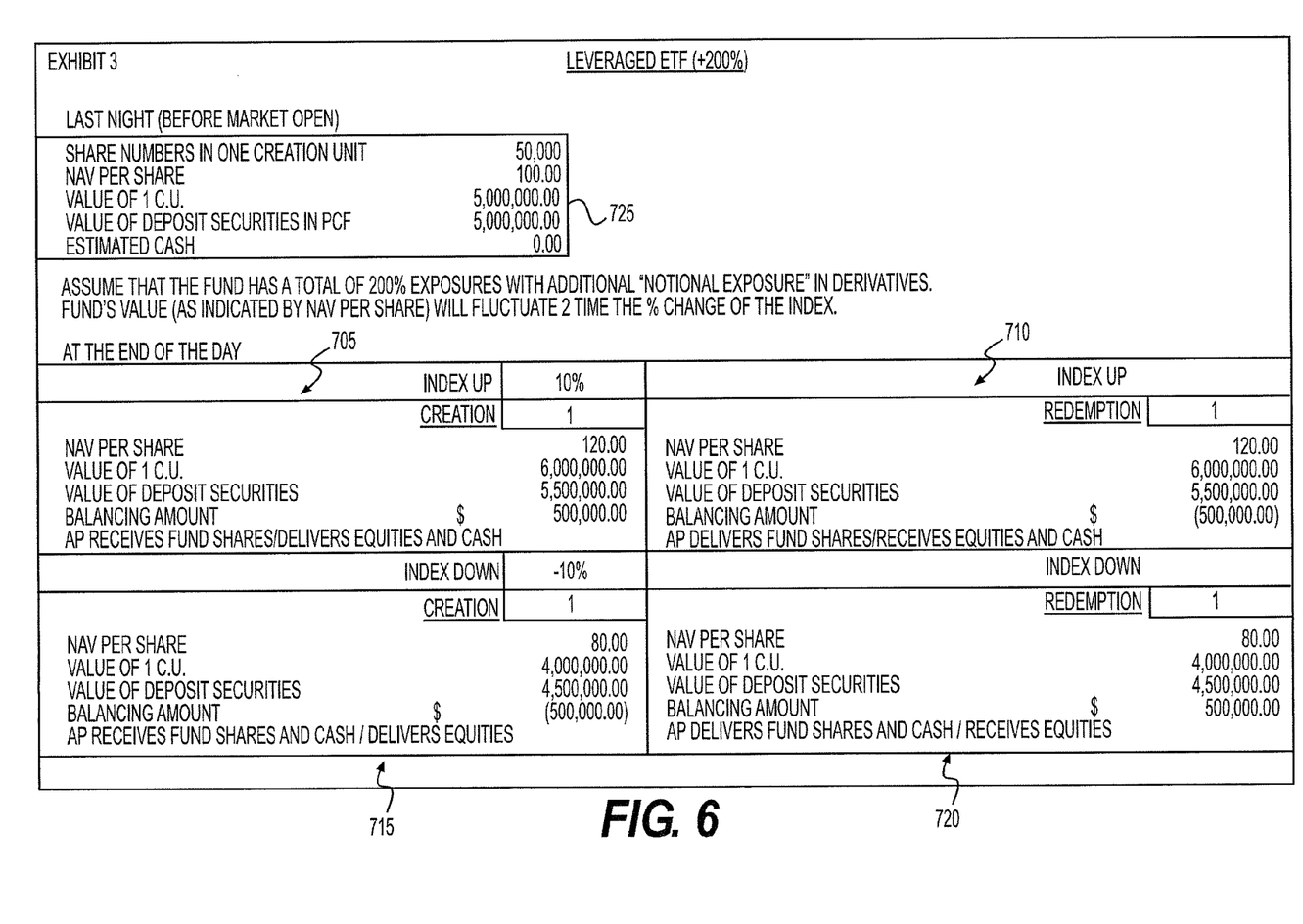
FIG. 6 provides exemplary calculations of the balancing amount for a Bullish ETF.

For both Bullish and Bearish ETFs, the present invention provides a unique IIV File. For Bullish ETFs, the provided IIV File supplements the standard PCF file which is the only data set used in conventional ETFs (or alternatively the IIV file contains all the information in the PCF file and contains additional information related to the derivative positions and swap contracts). In the case of Bearish ETFs, IIV File represents, in certain embodiments, the whole data set that enables the IIV calculation since no PCF is needed because the Bearish ETFs do not hold any equity positions. FIGS. 4-6 discussed further herein disclose the process of using the IIV File in the creation and redemption process of the Bullish and Bearish ETFs.

It should be noted that when calculating the daily NAV for the mutual funds and ETFs that contain derivatives positions, gains or losses from derivatives are reflected in NAV on an "accumulated" basis, assuming the derivatives positions are established and remain open over a period of time. That is, the periodic (for example, daily) gains or losses from the derivatives are carried forward and accumulated over the period of time during which the respective derivative positions are open. Therefore, in calculating IIV for Bullish and Bearish ETFs, the information regarding the "accumulated" gains or losses from all derivatives positions, as of end of the previous business day, needs to be delivered to the APs and an Exchange (or any party that calculates the IIV on an intraday basis). Therefore, the IIV File provides the mechanism by which these accumulated gains or losses are provided, for example, in the fields corresponding to the "net other assets" or NOA disclosed in the IIV File format shown in FIGS. 1 and 3B. It should be noted that the calculation of "mark-to-market" gains or losses for derivatives, described above as part of the IIV calculation methodologies for Bullish ETFs and Bearish ETFs (for example as shown in FIG. 3B), provides gain/loss figures only for the period between last night's closing to current time Therefore, the accumulated gains or losses as they exist for the derivatives in the Bullish and Bearish ETFs are not available to the party performing the calculation except by being provided by the particular IIV file as provided by certain embodiments of the present invention. Accordingly, the information from the IIV File provided by the present invention can be used to accurately calculate the IIV for the Bullish and Bearish ETFs since the accumulated losses and gains of the derivatives are provided in the IIV File and this information is not otherwise available to a third party from any other source.

Part II. Creation and Redemption of Bullish and Bearish ETFs

FIGS. 4 and 5 are diagrams that illustrate exemplary process flows for creating and redeeming Bullish and Bearish ETF shares with the statutory trust that issues the particular ETF shares. In practice, Bullish ETFs settle through NSCC as illustrated in FIG. 4 while Bearish ETFs do not use the NSCC facility as illustrated in FIG. 5. One skilled in the art would recognize that the particular entities described here in the creation and redemption process are exemplary only and other such entities (or combinations thereof) could perform the functions disclosed herein in the creation and redemption process for the ETFs.

A. Creation/Redemption Mechanism for Conventional Index-Based ETFs

Purchases (creations) and sales (redemptions) "directly" with the Exchange Traded Fund (ETF) can be done only in a multiple of a "Creation Unit", which typically consists of 50,000 Shares. In addition, these direct creations and redemptions can only be initiated by APs who have executed a Participant Agreement with the ETF. The dollar value of a single Creation Unit generally exceeds $1 million dollars. For example, an ETF with a $100 NAV per Share would have a Creation Unit value of $5,000,000 ($100×50,000 Shares).

Other investors (for example, retail investors) buy and sell the Fund Shares in the secondary markets through their brokers. Trades executed in the secondary market (e.g. the primary listing exchange, ECN) do not have any direct impact on the operation of the ETF.

The continuous ability of an AP to create or redeem ETF shares allows APs to engage in the market making and arbitrage activities and thereby effectively and efficiently keep the price of the ETF Shares traded on the exchange close to the real-time value (IIV) of the ETF during the trading hours.

Generally, creations and redemptions are transacted on an "in-kind" basis. When APs create ETF shares (in creation units), APs receive the ETF shares from the statutory trust and deliver the securities as specified in PCF (which represent the securities held by the ETF). When APs redeem the ETF shares (in creation units), the opposite occurs, that is, the APs exchange the ETF shares for the securities held by the ETF. If the values of the two (ETF shares vs. securities) do not match, cash is paid or received to equalize the difference. The cash to equalize the values of the two sides is called "Balancing Amount."

Typically, conventional index funds maintain "fully invested" positions in the securities that make up the underlying index. As a result, almost the entire portion of the assets in the conventional index-based ETFs comprises the equity or fixed-income securities. Therefore, any cash amount as Balancing Amount that has to be paid or received is generally small in the creations or redemptions of the conventional ETFs. In other words, the difference between the value of one Creation Unit and the value of the securities listed in PCF corresponding to one creation is generally quite small.

B. Creation/Redemption Mechanism for Bullish ETFs

The Bullish ETFs seek to provide daily investment results, before fees and expenses, that, for example, double (200%) the daily performance of the applicable index. That is, the percentage change of the estimated real-time value (or IIV) of these ETFs is expected to be approximately twice the percentage change of the underlying index at any given moment throughout the trading hours. The "percentage change" in this context is calculated by comparing the current market value to the previous day's closing value (4 pm official closing NAV for the Fund and 4 pm closing price for the index). For example, assuming previous day's NAV of the ETF is $100 and the underlying index that the Bullish ETF tracks increased 1% from previous day's close at a particular moment during the trading hours, the IIV of the ETF at that moment is expected to be at $102, indicating that the ETF's value is up 2% (($102−$100)/$100), which is twice the percentage change of the index.

Bullish ETFs utilize various derivative products to obtain the necessary leverage and target exposure as would be recognized by those skilled in the art. The value of each derivative contract is "marked-to-market" each day, following the change in the value of the underlying securities or index. As a result, unlike the conventional index ETFs, value of the securities in the PCF (i.e., the securities held by the ETF on a Creation Unit basis) may be significantly different from the value of one Creation Unit, since the gains or losses from the derivatives are reflected in calculating the value of Creation Unit It should be noted that the PCF does not include any derivatives information. In other words, the difference between the value of the Securities from PCF and the value of the shares in the Creation Unit may be much greater than in the case of conventional ETFs due to the extensive use of derivatives in the Bullish and Bearish ETFs. For example, the difference may be greater than 10% of the value of the Creation Unit and could even be 50% or higher.

In order to resolve this discrepancy, certain embodiments of the present invention expand the concept of Balancing Amount to include the portion that makes up the leverage. In the conventional ETFs, Balancing Amount reflects daily accruals and is generally small. In contrast, in the Bullish ETFs, the present invention uses the Balancing Amount as a way to reconcile the difference caused by the extensive derivatives positions. In other words, in order to equalize the value of the equity securities and value of the Units being created/redeemed, the Balancing Amount in IIV files for the Bullish ETFs includes the accumulated gains/losses from the derivatives positions. Therefore, Balancing Amount in the IIV file for Bullish ETFs is generally much greater than the balancing amount value in the IIV file for conventional ETFs.

FIG. 4 discloses an exemplary process flow in the creation and redemption of an ETF creation unit (as defined herein, a creation unit is the minimum aggregation of lot size of ETF shares that are created or redeemed by a fund creation and redemption entity 500. In certain embodiments, each of the blocks shown in FIG. 4 comprise a computing system or node while the arrows connected there between disclose network data flows between the computing nodes. The flow of information in FIG. 4 is discussed first with respect to steps (4) and (5) and is then followed by a discussion of steps (1), (2), and (3).

As shown in steps (4) and (5) of FIG. 4, the creation or redemption order is initiated by an authorized participant 500 and the order passes through a distributor 510 to an index receipt agent 520 acting on behalf of the ETF issuing Trust. In certain embodiments, each of the blocks represent a server or other computing system and the lines represent network or other data connections between the servers or computing systems. It should be recognized that each of the blocks need not be on different computing systems since two or more blocks could reside on one computing system. The creation and redemption order is then forwarded, in a continuation of step (4), to a clearing house 530 to initiate the settlement process. As shown in step (6), the creation and redemption transaction is completed by exchanging the ETF shares with the securities and a Balancing Amount (corresponding to the difference in value between the ETF shares and the securities). When creating units, the authorized participant 500 receives ETF shares in exchange for the securities. The flow is reversed from the flow discussed earlier for redemptions. In addition, the Balancing Amount is used to equalize the difference between the value of the ETF shares and securities as explained further herein with respect to the examples shown in FIG. 6.

FIG. 4 also shows the flow of the PCF file and the IIV File. The PCF file is transmitted, as shown in step (2), by the Index Receipt Agent to the clearing house 530 on each business day after receiving the information on the securities in step (1) from the Fund Manager. Once the PCF has been processed by the clearing house 530, it is available to all NSCC members such as the Authorized Participants 500. The IIV File on the other hand is created (also shown as step (3)) by the Fund Manager also on each business day, in collaboration with Fund Accountant, and is made available to the requesting parties, such as the Authorized Participants 500, so that they can, for example, perform arbitrage transactions based on the difference between the IIV of an ETF share and the market price of the ETF share as traded on an exchange.

FIG. 6 provides exemplary calculations of the balancing amount for a Bullish ETF that returns 200% of the return of the underlying index on a daily basis. The fund information from the previous closing is shown in table 725. As shown in table 725, the number of shares on one Creation Unit is 50,000 while the closing NAV per share was 100. Based on these values the value of one Creation Unit is $5,000,000. Furthermore, the value of the deposit securities in the PCF is also $5,000,000 and, therefore, the estimated cash amount is zero.

Block 705 shows the calculation of the balancing amount for creation of a creation unit of the ETF shares for the situation in which the underlying index has increased by 10%. Since the index is up 10%, the NAV per share is up by twice that amount (20%) from the previous close so that the value of 1 Creation Unit is $6,000,000. However, the value of deposit securities is up by 10% (since it tracks the index) to $5,500,000. Accordingly, the balancing amount has a value of $500,000 since that value balances the difference between the value of the ETF shares and the securities held by the fund (on a Creation Unit) basis. Accordingly, in the creation process, the party (for example, an AP) that creates Creation Unit of ETF shares, receives the ETF shares corresponding to one Creation Unit and delivers equities (worth $5,500,000) and cash (worth $500,000).

Block 710 discloses the calculation for the redemption process when the index is up by 10%. In this case, the AP would deliver the ETF shares (corresponding to one Creation Unit) and would in return receives the securities (worth $5,500,000) and a cash balancing amount (worth $500,000).

Block 715 shows the calculation of the balancing amount for the creation of a creation unit of the ETF shares when the underlying index has decreased by 10%. In this case, the NAV per share has declined by 20% (200% of the decline of the underlying index) to a value of 80. Therefore, the value of the one Creation Unit is $4,000,000 while the securities held by the ETF are worth $4,500,000 (as they declined by 10% corresponding to the decline in the index). Accordingly, when creating 1 Creation Unit of ETF shares, the Authorized Party delivers the securities (worth $4,500,000) and receives the ETF shares corresponding to 1 Creation Unit (worth $4,000,000) and a cash or cash equivalent balancing amount of $500,000.

Block 720 shows the calculation of the balancing amount for the redemption of a creation unit of the ETF shares when the underlying index has decreased by 10%. In this case, the Authorized Party delivers the ETF shares corresponding to one Creation Unit (worth $4,000,000) and a cash or cash equivalent balancing amount of $500,000 while receiving the securities worth $4,500,000 (corresponding to the securities held by the ETF for one Creation Unit).

Gains or losses from the derivatives positions are settled in cash and/or securities as part of Balancing Amount in creations/redemptions. Unlike the equity securities in the fund, the derivative contracts such as futures and swaps can not easily be transferred "in-kind." If such a mechanism is found to settle the derivatives "in-kind", it may be possible to handle the Balancing Amount by in-kinding the derivatives.

C. Creation/Redemption Mechanism for Bearish ETFs

The Bearish ETF Funds seek to provide daily investment results, before fees and expenses, that match a certain percentage (e.g. 100% or 200%) of the inverse (opposite) of the daily performance of the applicable underlying index.

The percentage change of the estimated real-time value (or IIV) of these Funds is expected to be the inverse of the percentage change of the underlying index at any moment throughout the trading hours. The "percentage change" in this context is calculated by comparing the current market value to the previous day's closing value (4 pm NAV for the Fund and 4 pm closing price for the index). For example, assuming previous day's NAV per ETF Share being $100, if the underlying index that the Bearish ETF, with the investment objective of −100% daily, tracks is down 1% from previous day's close at a particular moment during the trading hours, IIV of the Bearish ETF at that moment is expected to be at $101, indicating that the ETF's value is up 1%, which is 100% (or −1) times the percentage change of the index.

Bearish ETFs utilize various derivative products to obtain the target exposures, and the value of each derivative contract is "marked-to-market" following the change in the value of the underlying securities or index. Consequently, the value of Bearish. ETFs are determined mainly by the change in the value of those derivative contracts.

Bearish ETFs do not intend to carry any stocks and therefore, no securities are transferred "in-kind" between APs and the statutory trust for the creations or redemptions unless an efficient and feasible way to in-kind derivative positions is developed in the future. To resolve this issue, in certain embodiments, the present invention performs the creations/redemptions for Bearish ETFs as "All-Cash" transactions. After determining the NAV of the share, total cash amount for creations or redemptions can simply be calculated by multiplying that NAV to the number of shares being created or redeemed.

FIG. 5 is an operation flowchart that illustrates the process of redemption and creation of the Bearish ETF shares. In certain embodiments, each of the blocks represent a server or other computing system and the lines represent network or other data connections between the servers or computing systems. It should be recognized that each of the blocks need not be on different computing systems since two or more blocks could reside on one computing system. The processing steps shown in FIG. 5 are very similar to the corresponding steps in FIG. 4 with the exception that the creation and redemption process exchanges the ETF shares with a cash amount (a balancing amount) with no securities as shown in step (4). As shown in the Figure, there is also no PCF file created while the IIV File is created on each business day and made available to the Authorized Participants 500 so that they can perform arbitrage transactions based on the difference between the IIV of the ETF and its market price on the exchange. It should be noted that creation and redemption transactions will occur outside the NSCC.

D. Unique Features Related to Creation and Redemption of Bullish and Bearish ETFs In certain embodiments, the present invention provides a unique mechanism for the creation/redemption process for the Bullish and Bearish ETFs by efficiently dealing with the values of derivatives used to achieve the investment objectives of the Bullish and Bearish ETFs. For the Bullish ETFs, the present invention expands the Balancing Amount concept to include the "leverage make-up portion" that represents the market value of derivatives. In the case of Bearish ETFs, in certain embodiments, the present invention uses "All-Cash Payment" procedures to account for the value of the derivatives. Because the Bullish and Bearish ETFs are the only domestic ETFs which provide leverage or short exposures through the use of derivatives, the creation and redemption process for units of the Bullish and Bearish ETFs employ a unique technique not used with conventional ETFs. That is, the Balancing Amount or All-Cash Payment in the Bullish and Bearish ETFs include the accumulated gains/losses from the derivative positions. This feature provides the advantage that it facilitates the orderly creations and redemptions in the ETF marketplace.

Figure 7:
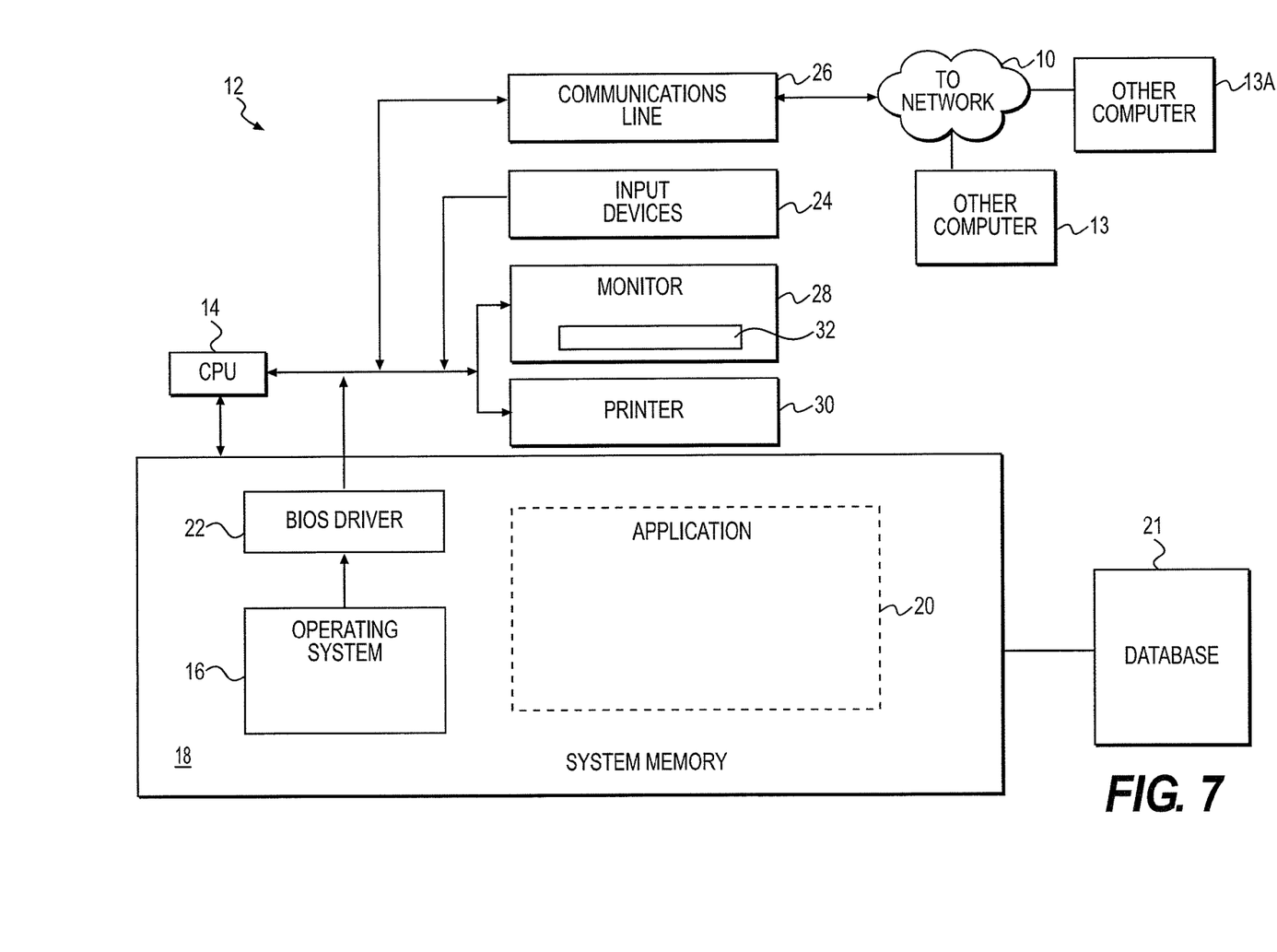
FIG. 7 illustrates the components of a generic computing system connected to a general purpose electronic network.

FIG. 7 illustrates the components of a generic computing system connected to a general purpose electronic network 10, such as a computer network. The computer network can be a virtual private network or a public network, such as the Internet. As shown in FIG. 7, the computer system 12 includes a central processing unit (CPU) 14 connected to a system memory 18. The system memory 18 typically contains an operating system 16, a BIOS driver 22, and application programs 20. In addition, the computer system 12 contains input devices 24 such as a mouse or a keyboard 32, and output devices such as a printer 30 and a display monitor 28, and a permanent data store, such as a database 21. The computer system generally includes a communications interface 26, such as an Ethernet card, to communicate to the electronic network 10. Other computer systems 13 and 13A also connect to the electronic network 10 which can be implemented as a Wide Area Network (WAN) or as an internetwork, such as the Internet. In certain embodiments, such a computer system 12 can be used to implement the third party processing system discussed herein including programmed code that implements the logic discussed herein with respect to FIGS. 1-6. One skilled in the art would recognize that such a computing system maybe logically configured and programmed to perform the steps to calculate the IIV as detailed in FIG. 4, implement the IIV file format as disclosed in FIGS. 1-6, perform the functions at each of the nodes (authorized participant 500, distributor 510, or fund creation/redemption entity 540) shown in FIGS. 4 and 5, and perform the exemplary balancing amount calculations shown in FIG. 6 at the fund creation/redemption entity 540.

One skilled in the art would recognize that the foregoing describes a typical computer system 12 connected to an electronic network 10. It should be appreciated that many other similar configurations are within the abilities of one skilled in the art and it is contemplated that all of these configurations could be used with the methods and systems of the present invention. Furthermore, it should be appreciated that it is within the abilities of one skilled in the art to program and configure a networked computer system to implement the method steps of certain embodiments of the present invention, discussed herein.

As noted above, embodiments within the scope of the present invention include program products comprising computer-readable media for carrying or having computer-executable instructions or data structures stored thereon. Such computer-readable media can be any available media which can be accessed by a general purpose or special purpose computer. By way of example, such computer-readable media can comprise RAM, ROM, EPROM, EEPROM, CD-ROM or other optical disk storage, magnetic disk storage or other magnetic storage devices, or any other medium which can be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above are also included within the scope of computer-readable media. Computer-executable instructions comprise, for example, instructions and data which cause a general purpose computer, special purpose computer, or special purpose processing device to perform a certain function or group of functions.

The invention is described in the general context of method steps which may be implemented in one embodiment by a program product including computer-executable instructions, such as program code, executed by computers in networked environments. Generally, program code include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represent examples of corresponding acts for implementing the functions described in such steps.

The present invention in some embodiments, may be operated in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, hand-held devices, multi-processor systems, microprocessor-based or programmable consumer electronics, network PCs, mini-computers, mainframe computers, and the like. The invention may also be practiced in distributed computing environments—where tasks are performed by local and remote processing devices that are linked (either by hardwired links, wireless links, or by a combination of hardwired or wireless links) through a communications network. In a distributed computing environment, program modules may be located in both local and remote memory storage devices.

Other embodiments of the invention will be apparent to those skilled in the art from a consideration of the specification and the practice of the invention disclosed herein. It is intended that the specification be considered as exemplary only, with such other embodiments also being considered as a part of the invention in light of the specification and the features of the invention disclosed herein. Furthermore, it should be recognized that the present invention includes the methods disclosed herein together with the software and systems used to implement the methods disclosed here.

What is claimed is:

1. A computer system for calculating an intraday indicative value ("IIV") of an Exchange Traded Fund ("ETF"), the computer system comprising:
 a communication processor configured to receive an intraday indicative value (IIV) file, the IIV file comprising:
  a closing value for fixed-income securities included in the ETF; and
  an accumulated value of at least one derivative product in which the ETF is invested, wherein the accumulated value includes a gain or loss of the at least one derivative product during a previous trading day; and
 a computing processor configured to determine an intraday indicative value of the ETF based on intraday value information regarding the at least one derivative product,
 wherein the intraday value information regarding the at least one derivative product comprises the accumulated value of the at least one derivative product and an intraday change in value of the at least one derivative product.

2. The computer system of claim 1, wherein the computing processor is configured to determine an intraday indicative value of the ETF further based on intraday value information regarding the fixed-income securities.

3. The computer system of claim 2, wherein the computing processor is further configured to receive an intraday change in value of the at least one derivative product.

4. The computer system of claim 2, wherein the computing processor is further configured to receive intraday performance information regarding the fixed-income securities.

5. The computer system of claim 4, wherein the intraday value information regarding the fixed-income securities comprises the closing value and the intraday performance information regarding the fixed-income securities.

6. The computer system of claim 2, wherein the computing processor is further configured to:
 compare the intraday indicative value of the ETF to a current market price of the ETF on a per share basis; and
 identify one or more arbitrage opportunities based on the comparison.

7. The computer system of claim 2, wherein the computing processor is configured to determine an intraday indicative value of the ETF in near real time.

8. The computer system of claim 7, wherein the at least one derivative product comprises at least one of a swap contract, a forward contract, a futures contract, or an options contract.

9. A nontransitory computer-readable medium, having instructions recorded thereon which, when executed on a computing system, perform a method for calculating an intraday indicative value of an Exchange Traded Fund ("ETF"), the method comprising:
 retrieving, by the computing system, intraday performance information regarding the fixed-income securities included in the ETF;
 determining, by the computing system, an intraday change in value of at least one derivative product included in the ETF;
 retrieving, by the computing system, an accumulated value of the at least one derivative product, wherein the accumulated value includes a gain or loss of the at least one derivative product during a previous trading day; and
 determining, by the computing system, the intraday indicative value of the ETF based on:
  the intraday performance information regarding the fixed-income securities;
  the accumulated value of the at least one derivative product; and
  the intraday change in value of the at least one derivative product.

10. The computer-readable medium of claim 9, wherein the method further comprises comparing, by the computing system, the intraday indicative value of the ETF to a current market price of the ETF, and identifying, by the computing system, one or more intraday arbitrage opportunities based on the comparison.

11. The computer-readable medium of claim 9, wherein the method further comprises determining, by the computing system, the intraday indicative value of the ETF in near real time.

12. The computer-readable medium of claim 11, wherein the at least one derivative product comprises at least one of a swap contract, a forward contract, a futures contract, or an options contract.

13. A computer system for calculating an intraday indicative value ("IIV") of an exchange traded fund ("ETF"), the computer system comprising:
 a communication processor configured to receive an intraday indicative value ("IIV") file, the IIV file comprising:
  an accumulated value of at least one derivative product in which the ETF is invested, wherein the accumulated value includes a gain or loss of the at least one derivative product during a previous trading day; and a computing processor configured to determine an intraday indicative value of the ETF based on intraday value information regarding the at least one derivative product, wherein the intraday value information regarding the at least one derivative product comprises the accumulated value of the at least one derivative product and an intraday change in value of the at least one derivative product.

14. The computer system of claim 13, wherein the computing processor is further configured to receive an intraday change in value of the at least one derivative product.

15. The computer system of claim 13, wherein the computing processor is further configured to:
compare the intraday indicative value of the ETF to a current market price of the ETF on a per share basis; and
identify one or more arbitrage opportunities based on the comparison.

16. The computer system of claim 13, wherein the computing processor is configured to determine an intraday indicative value of the ETF in near real time.

17. The computer system of claim 13, wherein the ETF is a bullish ETF.

18. The computer system of claim 13. wherein the ETF is a bearish ETF.

19. A computer system for calculating an intraday indicative value ("IIV") of an Exchange Traded Fund ("ETF"), the computer system comprising:
an electronic communication processor configured to receive an intraday indicative value (IIV) file, the IIV file comprising:
a closing value for fixed-income securities included in the ETF;
an accumulated value of at least one derivative product in which the ETF is invested, wherein the accumulated value includes a gain or loss of the at least one derivative product during a previous trading day; and
an electronic computing processor configured to:
determine an intraday indicative value of the ETF based on intraday value information regarding the at least one derivative product;
compare the intraday indicative value of the ETF to a current market price of the ETF on a per share basis; and
identify one or more intraday arbitrage opportunities based on the comparison,
wherein the intraday value information regarding the at least one derivative product comprises the accumulated value of the at least one derivative product and an intraday change in value of the at least one derivative product.

20. The computer system of claim 19, wherein the electronic computing processor is configured to determine an intraday indicative value of the ETF further based on intraday value information regarding the fixed-income securities.

21. The computer system of claim 20, wherein the electronic computing processor is further configured to receive an intraday change in value of the at least one derivative product.

22. The computer system of claim 20, wherein the electronic computing processor is further configured to receive intraday performance information regarding the fixed-income securities.

23. The computer system of claim 22, wherein the intraday current value for fixed-income securities comprises the closing value and the intraday performance information regarding the fixed-income securities.

24. The computer system of claim 20, wherein the electronic computing processor is configured to determine an intraday indicative value of the ETF in near real time.

25. The computer system of claim 24, wherein the at least one derivative product comprises at least one of a swap contract, a forward contract, a futures contract, or an options contract.

26. A computer system for calculating an intraday indicative value ("IIV") of an Exchange Traded Fund ("ETF"), the computer system comprising:
an electronic communication processor configured to receive an intraday indicative value (IIV) file, the IIV file comprising:
a closing value for fixed-income securities included in the ETF; and
an accumulated value of at least one derivative product in which the ETF is invested, wherein the accumulated value includes a gain or loss of the at least one derivative product during a previous trading day; and
an electronic computing processor configured to:
determine an intraday indicative value of the ETF based on intraday value information regarding the at least one derivative product,
wherein the intraday value information regarding the at least one derivative product comprises the accumulated value of the at least one derivative product and an intraday change in value of the at least one derivative product.

* * * * *